(12) United States Patent
Koga (10) Patent No.: US 8,595,530 B2
(45) Date of Patent: Nov. 26, 2013

(54) INFORMATION PROCESSING APPARATUS AND CONTROL METHOD OF INFORMATION PROCESSING APPARATUS

(75) Inventor: Kazuhiro Koga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 13/071,319

(22) Filed: Mar. 24, 2011

(65) Prior Publication Data

US 2011/0239023 A1 Sep. 29, 2011

(30) Foreign Application Priority Data

Mar. 25, 2010 (JP) ................................. 2010-070325
Apr. 7, 2010 (JP) ................................. 2010-088798

(51) Int. Cl.
*G06F 1/00* (2006.01)

(52) U.S. Cl.
USPC ........................................................ 713/323

(58) Field of Classification Search
USPC ................................................. 713/320–323
See application file for complete search history.

(56) References Cited

U.S. PATENT DOCUMENTS

| | | | |
|---|---|---|---|
| 5,911,081 A * | 6/1999 | Whatley et al. | ................ 713/320 |
| 5,923,919 A | 7/1999 | Nimura et al. | |
| 8,176,346 B2 * | 5/2012 | Kuroda et al. | ................ 713/320 |
| 2006/0136760 A1 * | 6/2006 | Chotoku et al. | .............. 713/300 |
| 2009/0276650 A1 * | 11/2009 | Kuroda et al. | ................ 713/320 |

FOREIGN PATENT DOCUMENTS

| | | |
|---|---|---|
| CN | 1657301 A | 8/2005 |
| CN | 1791515 A | 6/2006 |
| CN | 101373397 A | 2/2009 |
| CN | 101570087 A | 11/2009 |
| CN | 101650591 A | 2/2010 |
| JP | 2005-186426 A | 7/2005 |
| JP | 2009-295144 A | 12/2009 |

\* cited by examiner

*Primary Examiner* — Paul Yanchus, III
*Assistant Examiner* — Alyaa T Mazyad
(74) *Attorney, Agent, or Firm* — Canon USA Inc. IP Division (57) ABSTRACT

An information processing apparatus having a storage unit configured to store data, operated in a normal mode for supplying power to the storage unit or a power saving mode for preventing power supply to the storage unit, includes a determination unit configured to determine whether or not such a condition is established that the information processing apparatus is to be shifted from the normal mode to the power saving mode, and a measurement unit configured to measure an elapse time after a power source of the information processing apparatus is turned on.

6 Claims, 6 Drawing Sheets

INFORMATION PROCESSING APPARATUS AND CONTROL METHOD OF INFORMATION PROCESSING APPARATUS

BACKGROUND OF THE INVENTION

1. Field of the Invention

The present invention relates to an information processing apparatus and a control method of an information processing apparatus.

2. Description of the Related Art

In recent years, in viewpoint of environmental protection, power consumption of an electronic device is required to be low. In order to realize the low power consumption, an information processing apparatus uses a method for stopping the supply of electrical power to modules in a device such as storage unit when possible and shifting a mode thereof to a power saving mode.

If only suppression of power consumption to the lower level is considered, power may be frequently supplied to the modules as needed. However, as the number of times the device is turned ON and becomes larger, the possibility of the storage unit failure rises up. Therefore, if the storage unit is frequently turned ON and OFF, the storage unit may be failed before the product's life of the information processing apparatus having the storage unit ends. Accordingly, it is highly possible that the information processing apparatus becomes unavailable before the end of the product's life. The number of times the storage unit is turned ON and OFF refers to a number of times the power supply to the storage unit is increased or reduced without troubles, which the storage unit assures. Further, the product's life of the information processing apparatus means the operation time of the information processing apparatus without troubles, which the information processing apparatus assures.

In order to lessen such adverse operations, a standby time is set in advance and the power supply to the storage unit is stopped, after a job involving the start of the storage unit is finished and the standby time passes.

In general, the standby time of the storage unit is calculated from the product's life of the information processing apparatus and the number of ON/OFF times assured by the storage unit. As discussed in Japanese Patent Application Laid-Open No. 2005-186426, a standby time is obtained by dividing the product's life of the information processing apparatus by the number of ON/OFF times assured by the storage unit. Further, the information processing apparatus performs control to prevent the stop of the power supply to the storage unit until the elapse of the standby time.

However, in Japanese Patent Application Laid-Open No. 2005-186426, while it is possible to prevent the number of times the storage unit is turned ON/OFF from exceeding a predetermined number of times before the product's life of the information processing apparatus ends, it becomes difficult to stop the power supply to the storage unit.

A technique discussed in Japanese Patent Application Laid-Open No. 2009-295144 solves the above problem. According to No. 2009-295144, when the job is finished, if an elapse time (time elapsed after an apparatus is turned ON) is larger than a reference time (the product's life divided by ON/OFF times secured by the storage unit), the HDD is turned OFF.

However, since Japanese Patent Application Laid-Open No. 2009-295144 employs the above configuration, the HDD cannot be turned OFF immediately when the job is finished, for awhile after the apparatus is turned ON.

SUMMARY OF THE INVENTION

According to an aspect of the present invention, an information processing apparatus having a storage unit configured to store data, which operates in a normal mode of supplying power to the storage unit or a power saving mode of preventing power supply to the storage unit, includes a determination unit configured to determine whether a condition for shifting the information processing apparatus from the normal mode to the power saving mode, a measurement unit configured to measure an elapse time after a power source of the information processing apparatus is turned on, and a control unit configured to, when the determination unit determines that the condition is established, control the information processing apparatus to shift from the normal mode to the power saving mode at a first timing when a storage time obtained by subtracting a reference time from the elapse time by a number of times the information processing apparatus shifts from the normal mode to the power saving mode, is greater than a predetermined time which is less than the reference time, and further control the information processing apparatus to shift from the normal mode to the power saving mode when the storage time is less than the predetermined time, at a second timing which is later than the first timing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

The number of times the storage unit is turned ON and OFF refers to a number of times power to the storage unit is increased or reduced in operation of the storage unit without troubles, which the storage unit assures. Further, the product's life of the information processing apparatus refers to a period that the information processing apparatus operates without trouble which the apparatus assures.

Figure 1:
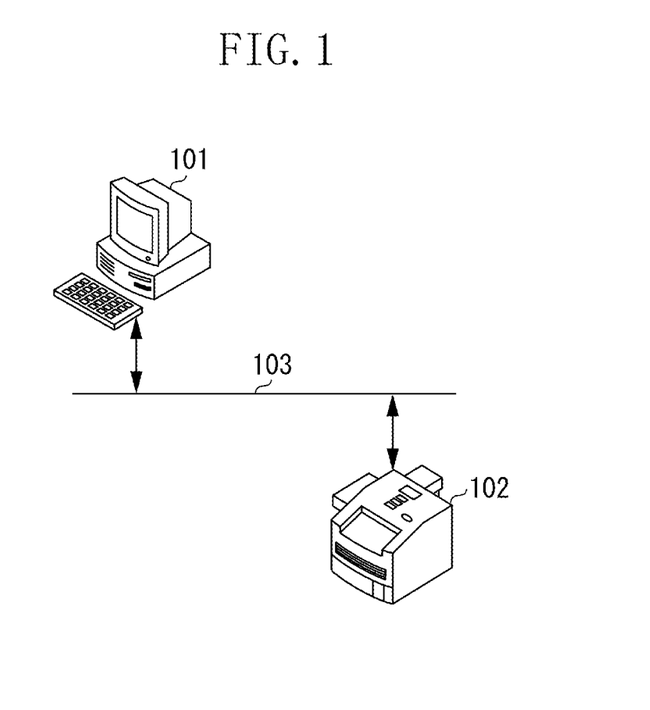
FIG. 1 illustrates a block diagram of a configuration of a system according to a first exemplary embodiment.

FIG. 1 illustrates a block diagram of a configuration of a system according to the first exemplary embodiment.

A network 103 connects a personal computer (PC) 101 to a printer 102, and transmits data such as image data. The PC 101 may be locally connected to the printer 102.

Figure 2:
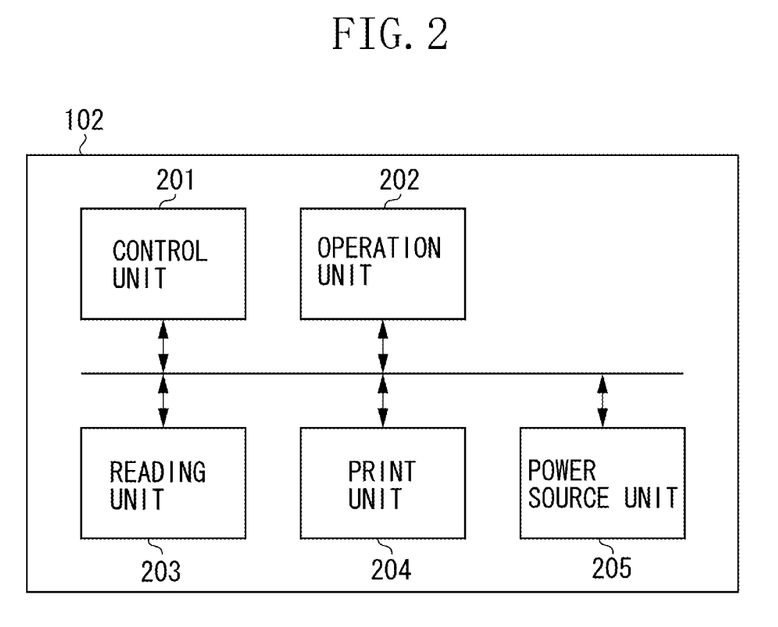
FIG. 2 illustrates a block diagram of a configuration of a printer according to the first exemplary embodiment.

FIG. 2 illustrates a block diagram of a configuration of the printer 102 according to the first exemplary embodiment. According to the present exemplary embodiment, the printer 102 is described as the information processing apparatus. However, an apparatus other than the printer 102 may be used as the information processing apparatus.

A control unit 201 controls components 202 to 205 in the printer 102. The details of the control unit 201 are described with reference to FIG. 3. An operation unit 202 includes a display unit and an input unit. The display unit provides an operation screen of the printer 102 to a user. The input unit receives various operations to the printer 102 from the user. The reading unit 203 reads image data from a document, and inputs the image data to the control unit 201. The print unit 204 forms an image on an output sheet based on the image data subjected to image processing by the control unit 201. A power supply unit 205 supplies power to the components 201 to 204 in the printer 102.

Figure 3:
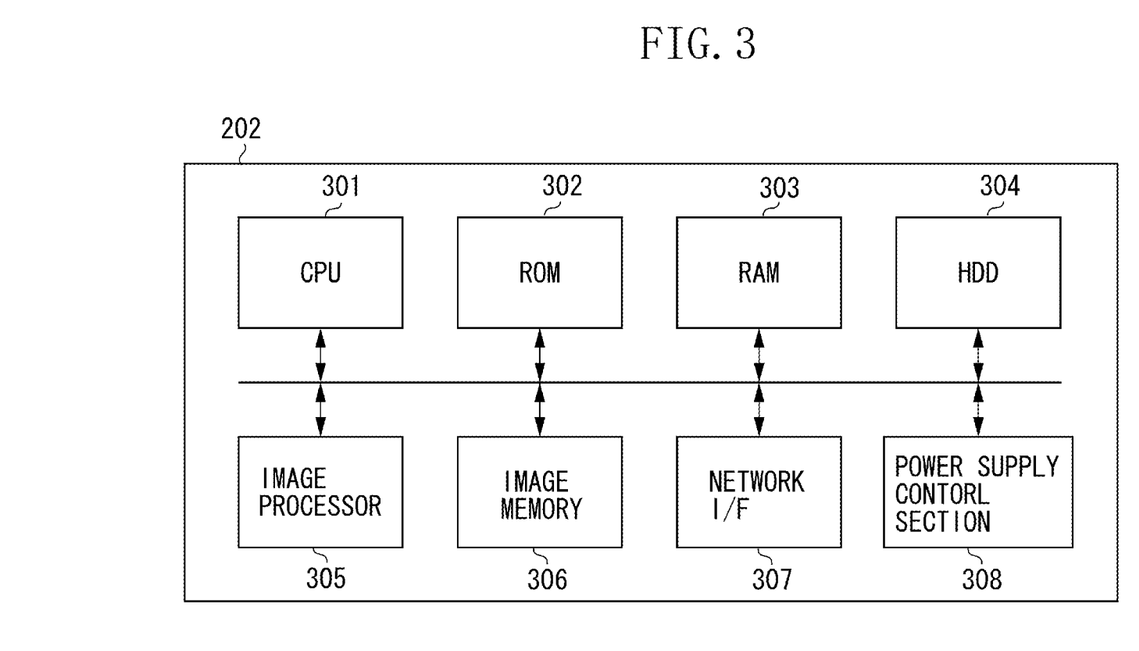
FIG. 3 illustrates a configuration of a control unit according to the first exemplary embodiment.

FIG. 3 illustrates a block diagram of a configuration of the control unit 201 according to the first exemplary embodiment.

A central processing unit (CPU) 301 controls the components 202 to 205 in the printer 102 and components 302 to 308 in the control unit 201 based on a program developed on a random access memory (RAM) 303. A read-only memory (ROM) 302 stores as a nonvolatile storage medium a boot program to be executed by the CPU 301. The RAM 303 is a volatile storage medium, on which an operating system (OS) or an application program is rasterized to be executed by the CPU 301 from a hard disk drive (HDD) 304. The HDD 304 stores as a nonvolatile storage medium the OS or application program to be executed by the CPU 301. An image processor 305 executes various image processing of the image data stored in an image memory 306. The image memory 306 as a volatile storage medium temporarily stores the image data input from the reading unit 203 or a network interface (I/F) 307. The network I/F 307 inputs and outputs the image data from an external apparatus such as the PC 101. A power supply control section 308 switches power supply from the power source unit 205 to the components 201 to 204 in the printer 102 or to the components 301 to 307 in the control unit 201.

Figure 4:
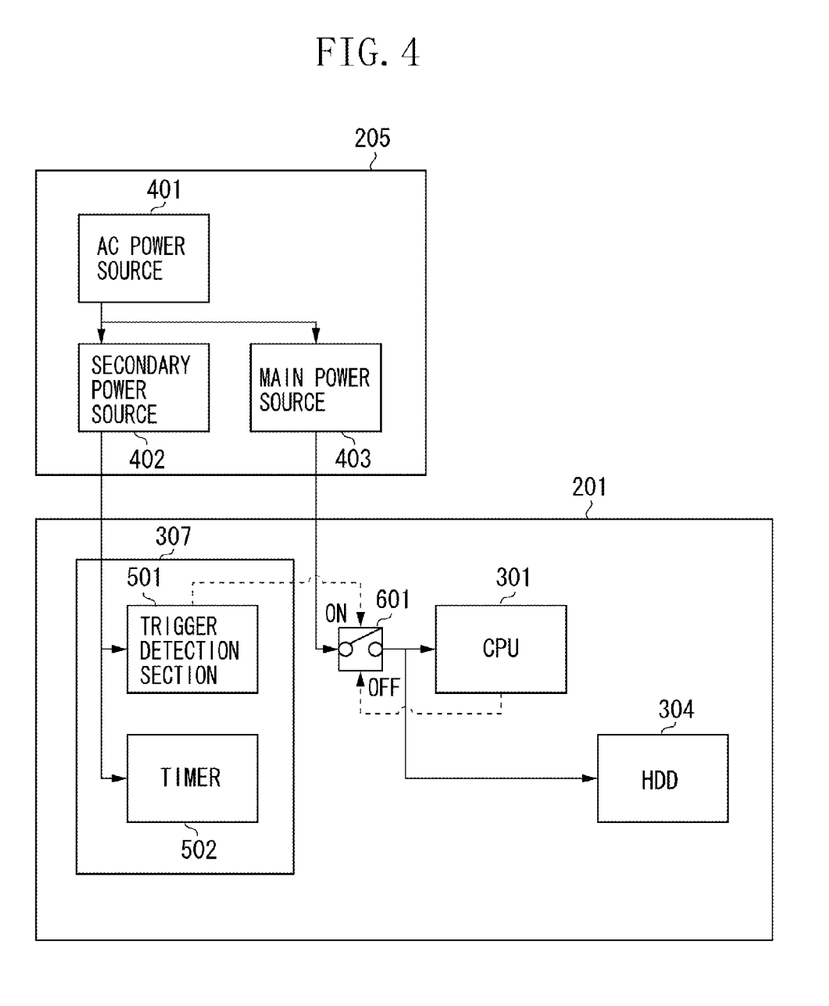
FIG. 4 illustrates a supply status of power to components in a power source unit and a configuration of power supply control to components in a central processing unit (CPU) and a power supply control unit according to the first exemplary embodiment.

FIG. 4 illustrates a power supply status to the components in the power source unit 205 and a configuration of power supply control to the components in the CPU 301 and the power supply control section 308 according to the first exemplary embodiment. A solid arrow indicates power supply and a dotted arrow indicates control of the power supply.

An alternating current (AC) power source 401 supplies electrical power to a secondary power source 402 and a main power source 403. The secondary power source 402 supplies power to the components in the power supply control section 308. The main power source 403 supplies electrical power to the CPU 301 and the HDD 304 via an ON/OFF switch 601. The main power source 403 may also supply power to the components 201 to 205 in the printer 102 (not illustrated) or the components 301 to 307 in the control unit 201 via the ON/OFF switch 601.

A trigger detection section 501 detects a data input from the operation unit 202, the reading unit 203, or the network I/F 307, and turns on an ON/OFF switch 601. A timer 502 measures a passage time after turning on the power of the printer 102. The timer 502 measures an ON-power time of the printer 102. Alternatively, with a battery (not illustrated), the timer 502 may measure a power-off time of the printer 102. Further, the timer 502 may use a real-time clock such as a calendar integrated circuit (IC) or a system timer held by the OS.

The ON/OFF switch 601 controls the CPU 301 and the trigger detection section 501, thereby switching ON/OFF of power supply from the main power source 403 to the CPU 301 and the HDD 304.

According to the first exemplary embodiment, the trigger detection section 501 controls the ON-operation of the ON/OFF switch 601, and the CPU 301 controls the OFF-operation. As a consequence, according to the ON/OFF operation of the ON/OFF switch 601, the CPU 301 and the HDD 304 are ON/OFF.

According to the present exemplary embodiment, when the printer 102 is operated in a normal mode, the power source of the HDD 304 is ON and the power is supplied to the HDD 304. According to the present exemplary embodiment, when the printer 102 is operated in the power saving mode, the power source of the HDD 304 is OFF and the power is not supplied to the HDD 304. A case that the power is not supplied to the HDD 304, includes not only a case where the power is not supplied to the HDD 304 but also a case where a small amount of power with which the HDD 304 is not operable is supplied to the HDD 304.

Figure 5:
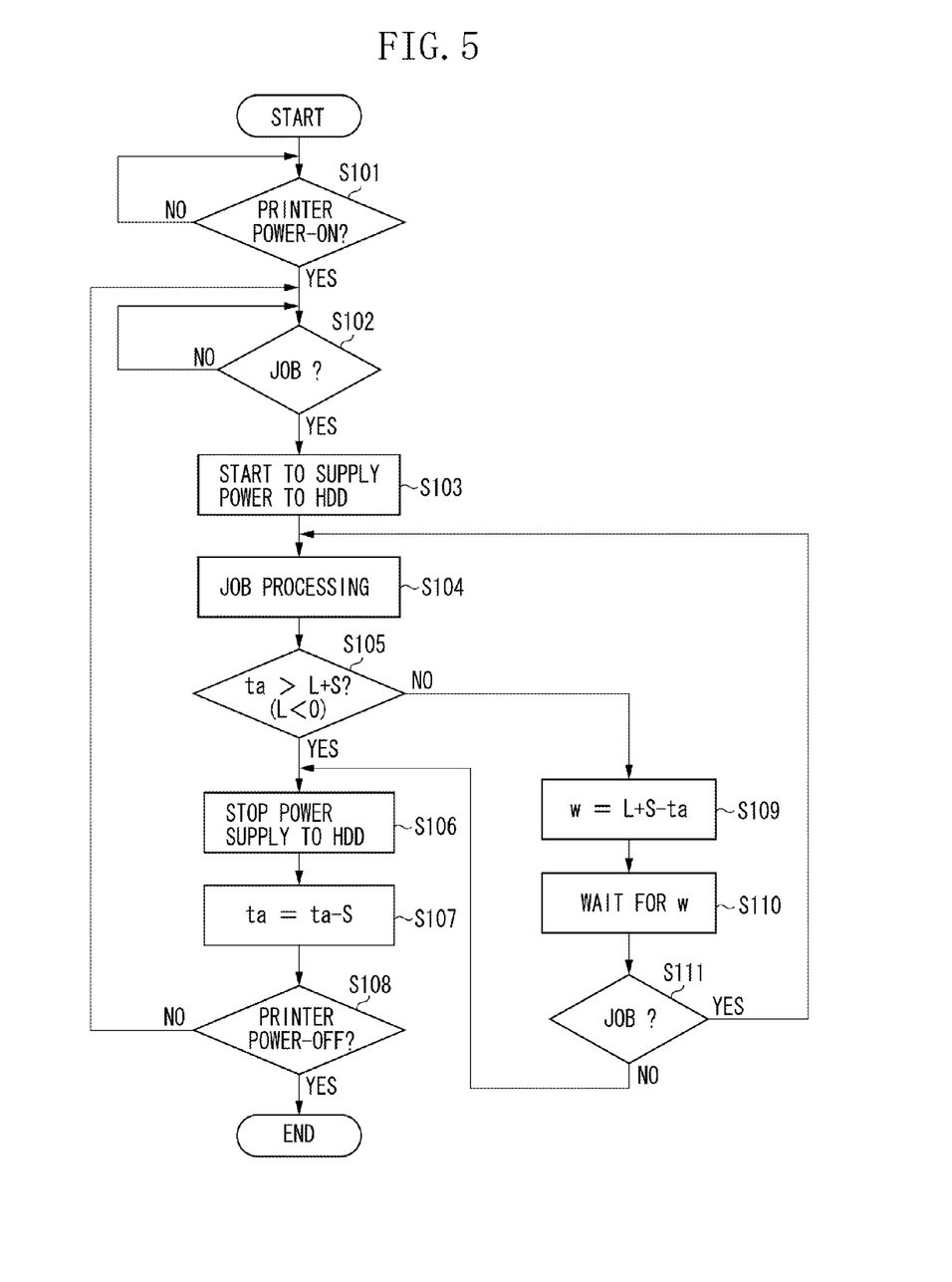
FIG. 5 illustrates a flowchart of the entire control of the printer according to the first exemplary embodiment.

FIG. 5 illustrates a flowchart of the entire control of the printer 102 according to the first exemplary embodiment. The control in the flowchart in FIG. 5 is executed by reading the program stored in the HDD 304 to the RAM 303, which is executed by the CPU 301.

According to the present exemplary embodiment, a job includes a reading job using the reading unit 203, a print job using the print unit 204, an operation response job using the operation unit 202, and a network response job using the network I/F 307. The jobs are mainly divided into a job which involves the start of the HDD 304 and a job which does not involve the start of the HDD 304. The reading job and the print job involve the start of the HDD 304. The operation response job and the network response job do not involve the start of the HDD 304.

In step S101, the apparatus is waiting until the power source of the printer 102 is ON. When the power source of the printer 102 is ON (YES in step S101), the CPU 301 proceeds the processing to step S102. When the CPU 301 proceeds the processing to step S102, the timer 502 starts the measurement of a storage time ta.

In step S102, the apparatus is waiting until the job is input. The trigger detection section 501 detects a trigger of the job, thereby detecting the job input. When the job is input (YES in step S102), in step S103, the power supply to the HDD 304 starts. In other words, the printer 102 shifts to the normal mode. The trigger detection section 501 controls the ON operation of the ON/OFF switch 601, thereby starting the power supply to the HDD 304. In step S104, the CPU 301 executes the processing of the job. The CPU 301 controls the units necessary for processing the job as a processing target in the printer 102 according to the type of the job, thereby executing the processing of the job. In step S104, the processing of the job ends. Then, when there is not a subsequent job for processing, it is determined that a condition for stopping the power supply from the power source 205 to the HDD 304 has been established. The CPU 301 proceeds the processing to step S105.

Depending on whether the storage time ta is equal to or greater than a value obtained by adding a reference time S to a lower limit threshold L (where L is less than 0), which is less than the reference time S, in step S105, it is determined whether the power supply to the HDD 304 should stop. More specifically, the value obtained by adding the reference time S to the lower limit threshold L is used for a transition reference to the power saving mode. The CPU 301 determines whether the printer 102 should shift to the power saving mode. In step S105, the determination is performed based on a relation of ta>L+S. Alternatively, the determination may be performed using any formula equivalent to ta>L+S. The storage time ta is a storage time of the timer 502 until the processing shifts to step S105. The reference time S is a reference used for preventing the number of times the HDD 304 is turned ON and OFF from exceeding the number of ON/OFF times assured by the HDD 304, within the product's life of the printer 102. The reference time S is calculated as S=P/H where P is the product's life of the printer 102 and H is the number of ON/OFF times assured by the HDD 304. The reference time S is stored in the HDD 304, and is read to the RAM 303 as needed. The printer 102 may calculate the reference time S. Alternatively, the reference time S may be stored in advance in the HDD 304. The lower limit threshold L is defined as an allowable lower limit threshold of the storage time ta used for actively stopping the power supply to the HDD 304 even when the storage time ta is shorter than the reference time S. The lower limit threshold L is stored in the HDD 304, and is read to the RAM 303 as needed. The printer 102 may calculate the lower limit threshold L. Alternatively, the lower limit threshold L may be stored in advance in the HDD 304. When the storage time ta is not less than the value obtained by adding the reference time S to the lower limit threshold L (YES in step S105), the CPU 301 proceeds the processing to step S106. When the storage time ta is less than the value obtained by adding the reference time S to the lower limit threshold L (NO in step S105), the CPU 301 proceeds the processing to step S109.

When the storage time ta is not less than the value obtained by adding the reference time S to the lower limit threshold L (YES in step S105), in step S106, the power supply to the HDD 304 stops at a timing (first timing) just after ending the processing of the job in step S104. In other words, the CPU 301 shifts the printer 102 to the power saving mode. The CPU 301 controls the OFF operation of the ON/OFF switch 601, thereby stopping the power supply to the HDD 304. In step S106, the power supply to the HDD 304 may stop when a predetermined time has lapsed after ending the processing of the job in step S104.

In step S107, the reference time S is subtracted from the storage time ta. More specifically, the storage time ta is newly calculated by subtracting the reference time S from the elapsed time measured by the timer 502 the number of passage times in step S107. According to the present exemplary embodiment, the storage time ta may be a negative value less than zero. Even when a long time has not elapsed after the power source of the printer 102 is ON, the power source of the HDD 304 can be immediately turned OFF.

In step S108, the CPU 301 determines whether or not the power source of the printer 102 is OFF. When the power source of the printer 102 is OFF (YES in step S108), the CPU 301 ends the processing. When the power source of the printer 102 is OFF (YES in step S108), the timer 502 ends the measurement of the storage time ta. When the power source of the printer 102 is OFF (YES in step S108), the storage time ta is stored in nonvolatile storage unit (not illustrated) and is read and used when the power source of the printer 102 is ON in step S101 (YES in step S101). When the power source of the printer 102 is not OFF (NO in step S108), the CPU 301 returns the processing to step S102.

When the storage time ta is not less than the value obtained by adding the reference time S to the lower limit threshold L (NO in step S105), in step S109, a predetermined standby time w is calculated. The standby time w ranges from the end of the processing of the job in step S104 to the stop of the power supply to the HDD 304 in step S506 via steps S509 to S511, while inputting no job to the printer 102. The standby time w is calculated by subtracting the storage time ta from the value obtained by adding the reference time S to the lower limit threshold L. In step S110, during the predetermined standby time w obtained in step S109, the CPU 301 is in the standby mode without stopping the power supply to the HDD 304. Thus, even when subtracting the reference time S from the storage time ta in step S107 after NO in step S105, the storage time ta is set to be not less than the lower limit threshold L. In step S111, the CPU 301 determines whether or not the job is input in the standby mode in step S110. When the CPU 301 determines that the job is input (YES in step S111), the CPU 301 proceeds the processing to step S104. When the CPU 301 determines that the job is not input (NO in step S111), the processing proceeds to step S106. In this case, in step S106, the power supply to the HDD 304 stops at a timing (second timing) that the predetermined standby time w has elapsed after ending the processing of the job in step S104.

In the above example, the storage time ta is measured only for the ON operation of the power source of the printer 102. Alternatively, also during the OFF operation of the power source of the printer 102, the timer 502 may continue to measure the storage time ta. In this case, a battery (not illustrated) is connected to the timer 502. When the power source of the printer 102 is OFF, the power can be supplied from the battery of the timer 502. Only when the CPU 301 first proceeds the processing to step S102 after starting to use the printer 102, the timer 502 starts the measurement of the storage time ta. The timer 502 does not end the measurement of the storage time ta even when ending the processing and the timer 502 also continues to measure the storage time ta after the processing.

In step S106, the power supply to the HDD 304 stops. Alternatively, the power supplied to the HDD 304 may be reduced, as compared with the usual time. The reduction in power supplied to the HDD 304 as compared with the usual time means, e.g., stop of the power supply to a motor that rotates a disc of the HDD 304. At this time, data is not read and written from/to the HDD 304.

Figure 6:
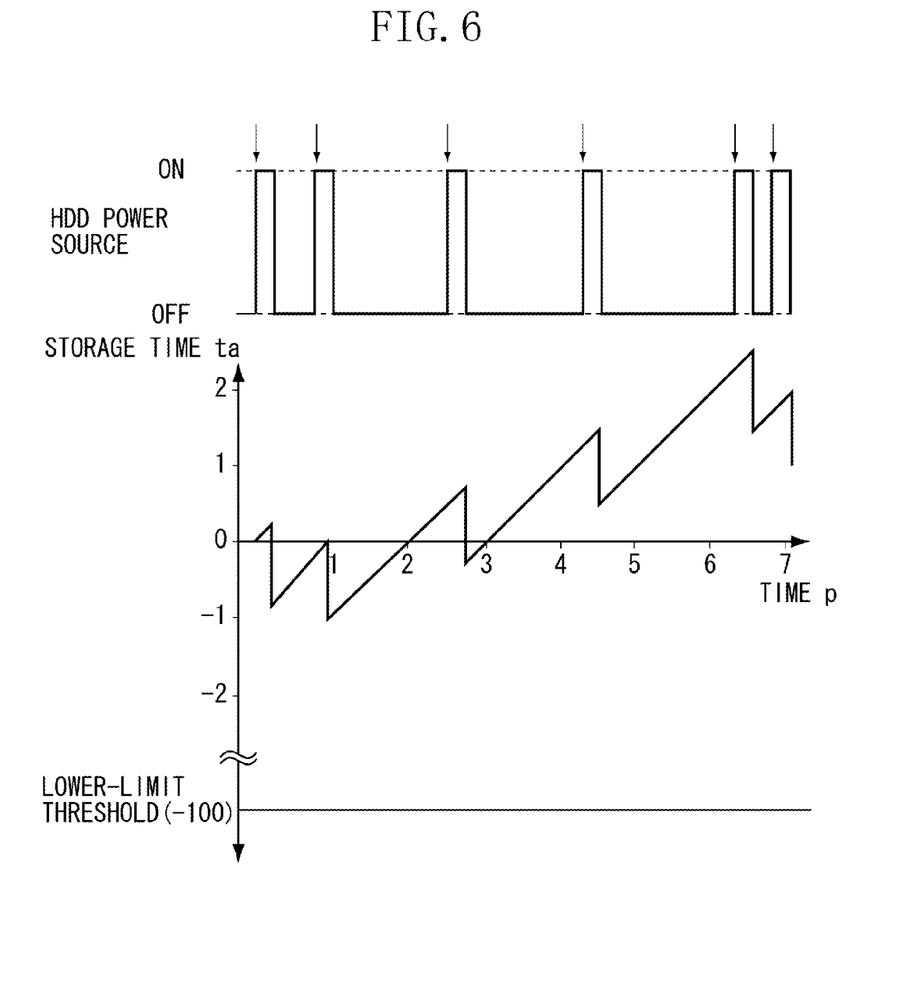
FIG. 6 illustrates a relationship between a time p and a storage time to after turning on the power source of the printer according to the first exemplary embodiment.

FIG. 6 illustrates a relation between a time p after the ON operation of the power source of the printer 102 and the storage time ta of the timer 502 according to the first exemplary embodiment. Referring to FIG. 6, a graph on the bottom illustrates the transition of the storage time ta when the reference time S is one hour and the lower limit threshold L is minus one hundred (−100) hours. A diagram on the top of FIG. 6 illustrates the transition of an ON/OFF mode of the power source of the HDD 304 corresponding to the bottom graph with an arrow in FIG. 6 indicating that the job is input to the printer 102.

The storage time ta is less than the reference time S after processing of a first job or a second job. However, since the storage time ta is not less than the value obtained by adding the reference time S to the lower limit threshold L, the power supply to the HDD 304 immediately stops. This operation corresponds to the transition from step S105 to step S106. Although FIG. 6 does not illustrate the transition from step S105 to step S109, the ON mode of the HDD 304 continues until the storage time ta reaches the value obtained by adding the reference time S to the lower limit threshold L.

Since the value obtained by adding the reference time S to the lower limit threshold L is used for the reference for transition to the power saving mode, if the storage time ta is less than the reference time S, the mode can immediately shift to the power saving mode after the processing of the job. More specifically, since the value obtained by adding the reference time S to the lower limit threshold L is used for the reference for transition to the power saving mode, the immediate transition to the power saving mode becomes easier after the processing of the job than the case of using the reference time S for the transition reference to the power saving mode.

Other Embodiments

Aspects of the present invention can also be realized by a computer of a system or apparatus (or devices such as a CPU, a microprocessing unit (MPU) and/or the like) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2010-070325 filed Mar. 25, 2010 and No. 2010-088798 filed Apr. 7, 2010, which are each hereby incorporated by reference herein in their entirety.

What is claimed is:

1. An information processing apparatus comprising:
    a storage unit;
    a detection unit configured to detect that a condition to decrease a power supply for the storage unit is satisfied;
    a determination unit configured to determine a timing at which the power supply for the storage unit is decreased, based on an elapsed time after the information processing apparatus is turned on, a reference time, a number of times the power supply for the storage unit is decreased, and a predetermined value which is less than zero; and
    a control unit configured to, when the detection unit detects that the condition is satisfied, decrease the power supply for the storage unit at the timing determined by the determination unit.

2. The information processing apparatus according to claim 1, wherein the elapsed time is subtracted by the reference time every time the power supply for the storage unit is decreased.

3. The information processing apparatus according to claim 1, wherein the determination unit determines a first timing, in case the elapsed time is greater than the predetermined value, and determines a second timing which is later than the first timing, in case the elapsed time is less than the predetermined value.

4. The information processing apparatus according to claim 1, further comprising:
    an execution unit configured to execute processing of a job based on the data stored in the storage unit,
    wherein the detection unit detects that the condition is satisfied when there is not a job to be subsequently processed after the execution unit ends the processing of the job.

5. The information processing apparatus according to claim 1, wherein the reference time is calculated by dividing an operation time assured by the information processing apparatus, by a number of times the storage unit is turned on or off without damaging the storage unit assured by the storage unit.

6. A control method of an information processing apparatus including a storage unit configured to store data, which operates in a normal mode of supplying power to the storage unit or a power saving mode of preventing power supply to the storage unit, the control method comprising:
    detecting that a condition to decrease a power supply for the storage unit is satisfied;
    determining a timing at which the power supply for the storage unit is decreased, based on an elapsed time after the information processing apparatus is turned on, a reference time, a number of times the power supply for the storage unit is decreased, and a predetermined value which is less than zero; and
    decreasing the power supply for the storage unit at the determined timing, when the detected condition is satisfied.

* * * * *